United States Patent [19]

Clot et al.

[11] Patent Number: 4,800,723

[45] Date of Patent: Jan. 31, 1989

[54] ELECTRICALLY-DRIVEN OPPOSED FLEXIBLE BELLOWS PUMP AND POSITION-CONTROLLED OPPOSED FLEXIBLE BELLOWS JACK SYSTEM

[75] Inventors: Jean Clot, Saint-Orens; Jean Falipou, Escalquens, both of France

[73] Assignee: Centre National de la Recherche Scientifique, Paris, France

[21] Appl. No.: 741,105

[22] Filed: Jun. 4, 1985

[30] Foreign Application Priority Data

Jun. 13, 1984 [FR] France .................. 84 09927

[51] Int. Cl.⁴ ............. B25J 3/00; F15B 7/00; F01B 19/04; F16J 3/06
[52] U.S. Cl. ............................. 60/545; 60/390; 92/39
[58] Field of Search .......... 60/538, 545, 390, 391, 60/431, 446, 594, 583; 92/37, 39, 117, 36, 5 R; 91/35, DIG. 1, 361, 363 R, 459, 275; 417/44, 388, 394; 318/563, 564, 625, 636, 657

[56] References Cited

U.S. PATENT DOCUMENTS

| | | | |
|---|---|---|---|
| 1,256,127 | 2/1918 | Gould | 92/39 X |
| 1,289,435 | 12/1918 | Fulton | 92/37 X |
| 1,543,061 | 6/1925 | Danielson | 92/37 X |
| 2,124,735 | 7/1938 | Flint | 92/39 X |
| 2,325,967 | 8/1943 | Moore | 92/35 X |
| 2,496,729 | 2/1950 | Lehman et al. | 92/39 X |
| 2,578,265 | 12/1951 | Saalfrank | 92/39 X |
| 2,909,315 | 10/1959 | Sampietro | 91/35 X |
| 3,095,532 | 6/1963 | Floyd | 417/44 |
| 3,309,588 | 3/1967 | Martin et al. | 318/564 |
| 3,401,607 | 9/1968 | Wortman | 92/39 |
| 3,904,416 | 9/1975 | Onoda et al. | 91/35 X |
| 3,966,358 | 6/1976 | Heimes et al. | 417/44 X |
| 4,279,192 | 7/1981 | Kleinwaks | 91/361 |
| 4,336,745 | 6/1982 | Lund | 91/35 |
| 4,481,451 | 11/1984 | Kautz et al. | 91/361 X |
| 4,498,350 | 2/1985 | Ross | 74/89.15 |
| 4,558,989 | 12/1985 | Chappell | 417/44 |
| 4,586,394 | 5/1986 | Perkins | 74/89.15 X |
| 4,607,202 | 8/1986 | Koenig | 318/628 |
| 4,607,998 | 8/1986 | Hawkes | 60/545 X |
| 4,696,163 | 9/1987 | Glomeau | 60/390 X |

FOREIGN PATENT DOCUMENTS

| | | | |
|---|---|---|---|
| 2416365 | 10/1979 | France | 60/390 |
| 140071 | 10/1979 | Japan | 318/561 |
| 192603 | 11/1982 | Japan | 91/361 |
| 823665 | 4/1981 | U.S.S.R. | 91/361 |
| 2084352A | 4/1982 | United Kingdom | 417/44 |

OTHER PUBLICATIONS

Poythress, G. W., "Linear Incremental Positioning Device", *IBM Technical Disclosure Bulletin*, vol. 3, No. 2, p. 75, Jul. 1960.

Primary Examiner—Edward K. Look
Assistant Examiner—George Kapsalas
Attorney, Agent, or Firm—Harold H. Dutton, Jr.

[57] ABSTRACT

A flexible bellows connecting device which positions an output member has a pair of jacks (1,2) equipped with deformation sensors (12,13). A pair of variable capacity bellows pump reservoirs (3,4) permit predetermined motion of the jacks. An electric motor (19) drives the pump. The sensor signals provide deformation difference signal feedback to the electronic control system which may include a microprocessor (5) for closed loop position control.

13 Claims, 2 Drawing Sheets

ELECTRICALLY-DRIVEN OPPOSED FLEXIBLE BELLOWS PUMP AND POSITION-CONTROLLED OPPOSED FLEXIBLE BELLOWS JACK SYSTEM

BACKGROUND OF THE INVENTION

1. Field of The Invention

The invention concerns a movable connecting device between a supporting element and a supported element. The invention applies to the field of robotics, to the design and manufacture of manipulator arms.

2. Description of The Prior Art

The French patent application 82,21389 describes a differentially acting connecting device which includes:
- a supporting framework designed to be fixed on the bearer element,
- a movable framework designed to allow fixing the borne element
- a plurality of flexible jacks arranged between the bearer framework and the movable framework so as to keep said movable framework and said bearer framework in a relative position depending on the set of deformed states of said flexible jacks.
- a variable-capacity reservoir associated with each of said flexible jacks and forming with the particular jack a closed fluid circuit so that the capacity of said reservoir constrains the deformation state of the flexible jack, each set consisting of a flexible jack and a variable-capacity reservoir being associated with second set consisting of a flexible jack and a variable-capacity reservoir in order to form a differential system.
- a drive varying the capacity of the above cited reservoirs to set them to specific values and arranged to simultaneously drive two reservoirs associated in such a way that their capacities vary inversely, the two associated flexible jacks undergoing opposite deformations,
- measuring means associated with each flexible jack and designed to emit a signal representing the deformation state of the said flexible jack.

SUMMARY OF THE INVENTION

The present invention concerns improvements in this type of device.

One object of the invention in particular is to provide a device wherein any displacement is by hydraulic compression in order to eliminate the limitations on power determined by the cavitation phenomena in the pressure-reduction systems.

Another object is to permit precise displacements which are unaffected by spurious deformations in the various flexible members of the system (connection conduit, bellows) or by the compressibility of the fluid being used (as a rule a liquid to restrict this compressibility).

To that end the device of the above defined type is provided with:
- a processing unit arranged to receive the signals emitted by the measuring means associated with each flexible jack and designed to emit differential signals for each pair of associated flexible jacks representing the difference between the deformation states of the two jacks of said pair,
- a set-signal generation unit designed to emit set signals corresponding to the desired deformation states of the pairs of flexible jacks,
- a comparison unit arranged to receive the above cited differential signals and the set signals and designed to emit the error signals
- a controller for the above cited drive means and arranged so as to receive the error signals and designed to control the drive in the sense of nulling error signals.

As will be better understood below, such a closed-loop device operates differentially both with respect to the actuating means (flexible jacks) and their control means (variable-capacity reservoirs, drive, and measuring means). In this manner it is possible to obtain very precise displacements of the borne elements which are unaffected by any spurious phenomenon; furthermore, each displacement is implemented by hydraulic compression in one of the two associated jacks, whereby any cavitation phenomena that might appear beyond a certain power are eliminated entirely from the performance.

BRIEF DESCRIPTION OF THE DRAWINGS

The description below and in reference to the attached drawings presents illustratively and without implying restriction several embodiment modes of the invention.

DETAILED DESCRIPTION OF THE PREFERRED EMBODIMENT

Figure 1:
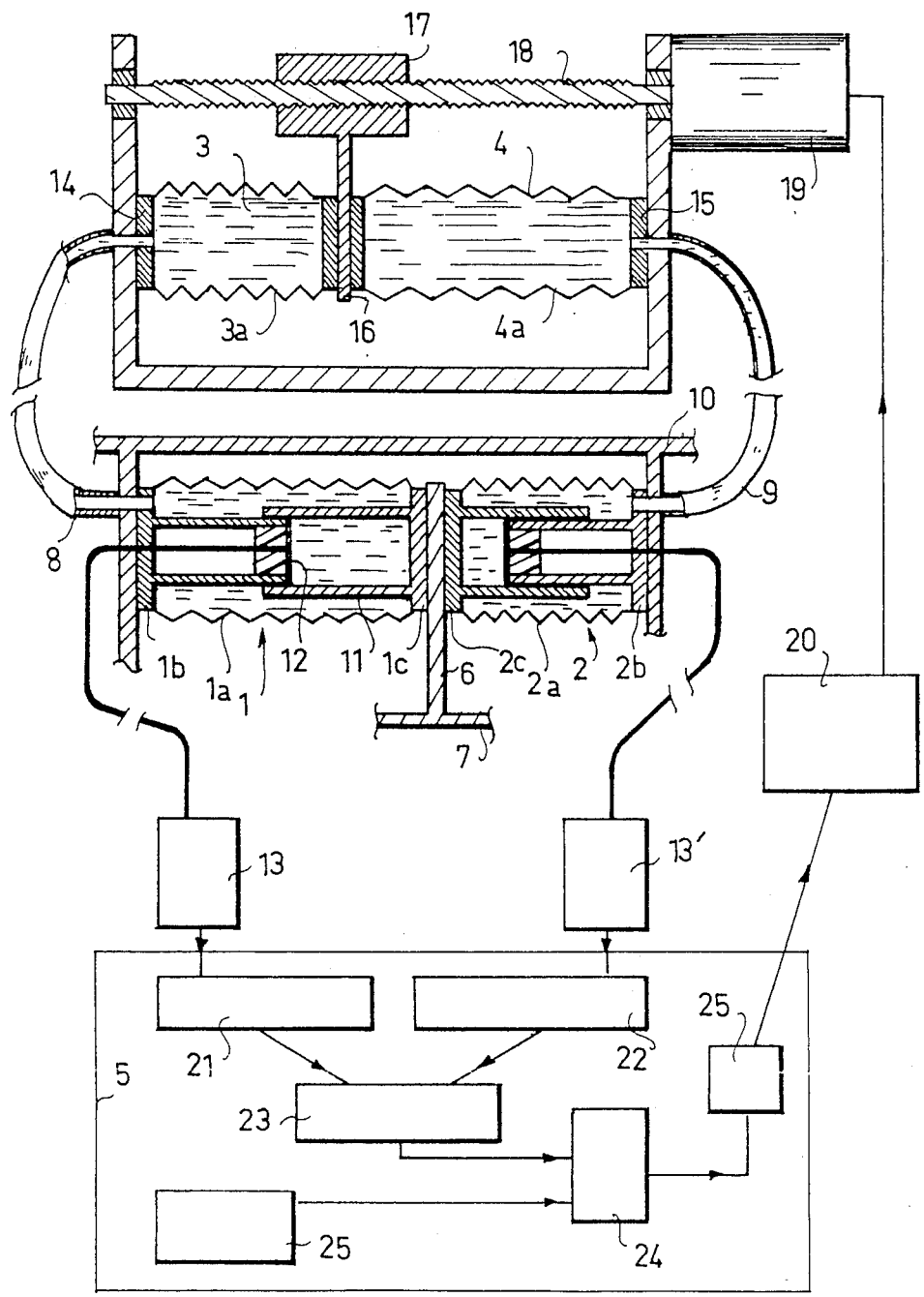
FIG. 1 is a partial schematic view illustrating a first embodiment of the invention.

FIG. 1 shows a pair of associated jacks, the corresponding reservoirs and an electronic processing unit 5 providing the servo-control of the system.

In this embodiment, the jacks 1 and 2 comprise two bellows 1a or 2a each fixed to two rigid walls 1b, 1c, 2b or 2c. The bellows 1a, 2a extend along the same axis on either side of a rigid partition 6 fixed to the walls 1c and 2c and solidly joined to a framework 7.

The other walls 1b and 2b are crossed by fluid conduits 8 and 9 and in this example are solidly joined to a frame 10. The jacks 1 and 2 thus allow displacing the framework 7 with respect to the frame 10; these frame means constitute the intermediate frames which may be arranged with other pairs of jacks as shown in the embodiments described in the French patent application 82, 21389 already mentioned or in any arrangement suiting the related application.

In this example, each pair of jacks 1 and 2 of the device is arranged in such a manner that the centers of the two walls 1b, 1c or 2b, 2c bounding each jack are constantly located on the common axis of the bellows 1a and 2a; this can be done using guides such as 11 which guide the displacement of the jack walls in a translational motion parallel to the axis.

Moreover, each jack is provided with an ultrasonic transceiver 12, 12' located in each bellows on the bellows axis and in a position which is fixed with respect to one of the two walls (1b) so as to transmit toward the center of the other wall (1c). This transceiver is associated with electronic means 13 or 13' (for instance bistable circuits) designed to emit an electrical signal representing the time between the transmission and the receiving of the corresponding echo.

Such measuring means which permits an indication at any time of the deformation state of the particular jack are known per se and in particular may include a quartz wafer associated with pulse excitation means of its natural frequency, the receiving in this particular case being performed by the same wafer. The time between a transmission and receiving its echo represents twice the distance between the wafer 12 and the wall 1c and hence the state of deformation of the jack along its axis.

In a variation of the embodiment, it is also possible to keep the transmitter separate from the receiver and to provide in each bellows a transmitting wafer at the center of a wall so as to transmit toward the center of the other wall, to further provide a receiving wafer at the center of this other wall and electronic means for emitting an electric signal representing the time between a transmission from this transmitter and reception by this receiver.

The two jacks 1 and 2 are hydraulically connected by the conduits 8 and 9 to the variable-capacity reservoirs 3 and 4. These reservoirs are formed by two bellows 3a, 4a extending along a common axis between two fixed walls 14 and 15 supported on a frame and crossed by the fluid conduits 8 and 9.

The bellows 3a and 4a are kept apart by a movable partition 16 which can move along the bellows axis and which is connected to drive means to displace it along this axis.

In this embodiment, the partition 16 is attached to a threaded sleeve 17 engaging an endless screw 18 parallel to the bellows axis. An electric reduction motor 19 hooked up to a power source 20 permits rotating the screw 18 in either direction.

The two electric signals emitted by the measuring means (12, 12') associated with each pair of jacks (1, 2) are processed by the unit 5. Each of the two signals is fed to a sampling circuit 21 and 22 generating a pulse sequence, the number of pulses being proportional to the duration of the initial signal and representing the deformation state of the jack being considered. The pulses from the circuits 21 and 22 are fed to a difference-determining device 23 which emits a difference digital signal representing the difference in the number of pulses of the two signals from the sampling circuits.

This digital signal represents the state of the differential system comprising the two jacks 1 and 2.

This digital signal is fed to a comparision unit 24 including digital counters and also receiving a digital set-signal from a generator unit 24'; this generator unit 24' is designed to emit digital set-signals corresponding to the desired deformation states of jacks 1 and 2.

The comparision unit 24 emits a digital error signal and feeds it to a digital/analogue converter 25; following conversion, the signal is amplified and controls the power source 20 feeding the reduction motor 19. The rotation of this motor is controlled in that direction which cancels the control signal.

The various above mentioned functions can be provided by a microprocessor which generates the set-signals due to a suitable program and which controls setting of the motors 19 associated with the set of reservoir pairs 3, 4 as a function of these set-signals and measurement signals.

Figure 2:
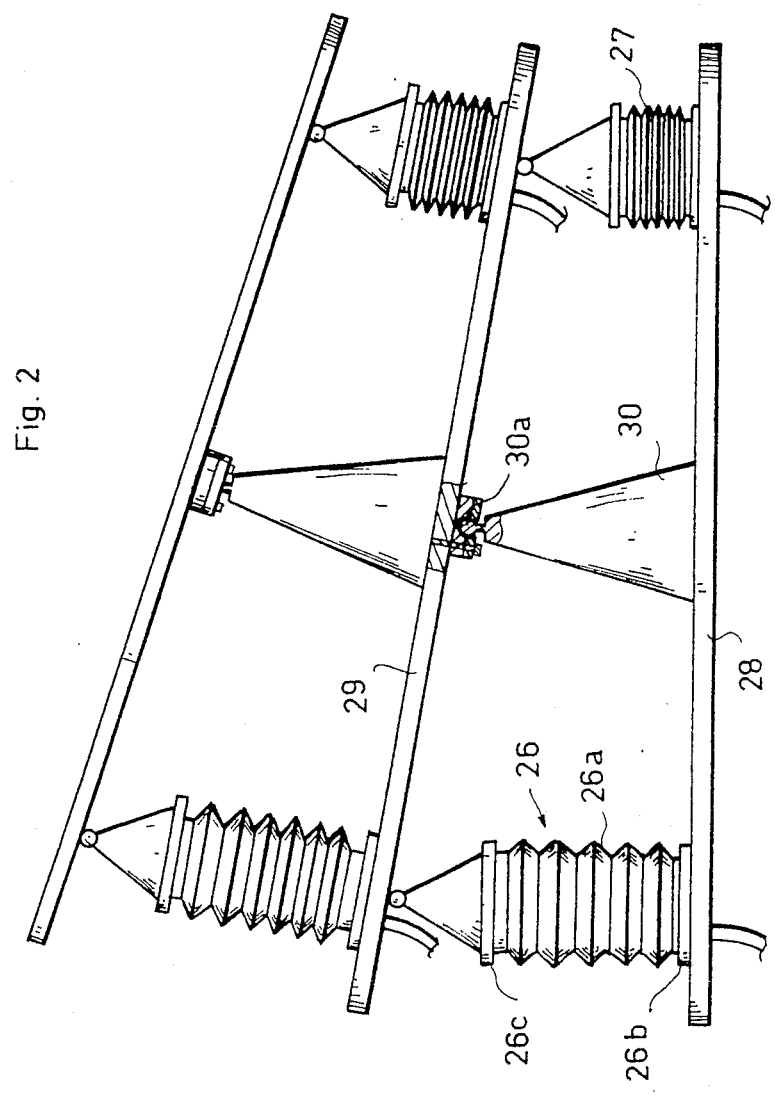
FIG. 2 is a partial schematic view showing another embodiment mode of the invention. The connecting device which is the object of the present invention may be in the form of various arrangements implementing a manipulation system depending on the application considered. This connecting device includes several pairwise associated jacks controlled from variable-capacity reservoirs themselves associated in pairwise manner, whereby each associated pair of jacks together with each associated pair of reservoirs forms a closed-loop differential system.

FIG. 2 is a schematic view of a variation of the device. In this variation, the variable-capacity reservoirs and the processing unit are similar to those of the previous embodiment, and are omitted. On the other hand the flexible jacks 26 and 27 are paired in such a manner as to make a first rigid framework, such as 28, pivot with respect to a second rigid framework such as 29.

These paired jacks are actuated in the same manner as before in differential manner so that they undergo opposite deformations.

The jacks extend along two substantially parallel axes between the two rigid frameworks 28 and 29. Each jack includes a bellows such as 26a which is fixed to two rigid walls 26b and 26c. The wall 26b is fixed to the framework 28 and is crossed by the hydraulic conduit. The wall 26c supports a roller bearing resting against the framework 29. Furthermore the jacks 26 and 27 are provided with measuring means of the same type as above for emitting an electrical signal representing their deformation states.

The two frameworks 28 and 29 are connected by a spacer 30 fastened to the framework 28 and hinging by a swivel-joint 30a on the framework 29.

The deformation state of the jacks 26 and 27 controls the sloping angle of the framework 29 with respect to the framework 28 in the plane of the two jacks.

An analogous system of two associated jacks may be provided in an orthogonal plane in order to control the slope of the two frameworks in this plane. Thereby it is possible to incline the framework 29 about its articulation means in all directions in space by a magnitude depending on the strokes of the jacks.

Several systems such as defined above can be stacked in series to obtain a manipulating arm for extremely precise spatial displacements. By looping the control systems in the differential mode, displacement becomes independent of load, of the compressibility of the liquid used and of spurious deformations.

Also, any displacement is by means of a compression jack, allowing very high powers.

We claim:

1. A system for connecting a supporting element and a supported element for enabling relative displacement between said elements comprising a support framework secured to said supporting element and a movable framework for positioning the supported element; at least one pair of flexible jacks (1, 2) arranged between the support framework and the movable framework in such a manner as to position the movable framework with respect to the support framework as a function of the relative deformation of said jacks; a variable capacity reservoir (3, 4) associated with and connected to each of said flexible jacks and forming with the associated jack a closed fluid circuit so that the capacity of the associated reservoir determines the state of deformation of the respective jack; each of said jacks forming with the associated reservoir a set (1, 3 and 2, 4) and the sets forming a differential system with respect to each other; drive means (19) operating on the reservoirs of two sets for inversely varying the capacity of said reservoirs (3, 4) and causing oppositely directed deformation of said jacks; measuring means associated with each of said jacks for emitting a signal representative of the deformation of each of said jacks; processing means (21, 22, 23) for receiving the signals from said measuring means and for generating a differential signal indicative of the difference in the deformation of each jack in said pair; means (25) for generating and transmitting a set signal corresponding to desired deformation of said pair of jacks, and comparison means (24) for comparing said differential signal and said set signal and for transmitting an error signal representative of the difference between said differential signal and said set signal; and control means (20) operatively connected to said drive means for receiving said error signal and causing operation of said drive means in a direction tending to cancel said error signal.

2. A system as in claim 1 and wherein each reservoir associated with a pair of jacks comprises two oppositely directed bellows positioned on a common axis, each of said bellows having their remote end walls mounted on fixed walls and having their proximate ends mounted on a common movable partition wall, said partition wall being connected to said drive means whereby said drive means may move said partition wall along the axis of said bellows.

3. A system as in claim 2 and wherein said partition wall is threadedly connected to a screw and motor means for rotating said screw, thereby moving said partition wall.

4. A system as in claim 1 and wherein each jack (26, 27) of said pair comprises a bellows having rigid walls at opposite ends thereof, each of said jacks extending between two rigid frameworks (28, 29) arranged in such a manner as to pivot relative to each other by the differential action of said two jacks.

5. A system as in claim 4 and wherein the walls forming the ends of each of said jacks have their centers on the axis of the bellows; said measuring means including a transceiver (12, 12') on the axis of the bellows and fixed with respect to one of the walls forming one end of the bellows so as to transmit toward the other of the walls forming the other end of the bellows for transmitting a signal toward the opposite wall and receiving an echo from the opposite wall and generating a signal indicative of the time between transmission of said signal and receipt of said echo.

6. A system as in claim 4 and wherein the walls forming the ends of each of said jacks have their centers on the axis of the bellows; said measuring means including a transmitter mounted on one of the walls forming one end of the bellows for transmitting a measuring signal and a receiver mounted on the wall forming the opposite end of the bellows for receiving said measuring signal, and means for generating a differential signal indicative of the time between transmission and receipt of said signal.

7. A system as in claim 4 and wherein said transmitter and said receiver each comprise a quartz wafer.

8. A system as in claim 1 and wherein each jack (1, 2) of said pair comprises a bellows coaxially mounted on opposite sides of a partition, each of said bellows being sealed at the end thereof opposite said partition by walls having a fluid passageway leading to the interior of said bellows.

9. A system as in claim 8 and wherein the walls forming the ends of each of said jacks have their centers on the axis of the bellows; said measuring means including a transceiver (12, 12') on the axis of the bellows and fixed with respect to one of the walls forming one end of the bellows so as to transmit toward the other of the walls forming the other end of the bellows for transmitting a signal toward the opposite wall and receiving an echo from the opposite wall and generating a signal indicative of the time between transmission of said signal and receipt of said echo.

10. A system as in claim 8 and wherein the walls forming the ends of each of said jacks have their centers on the axis of the bellows; said measuring means including a transmitter mounted on one of the walls forming one end of the bellows for transmitting a measuring signal and a receiver mounted on the wall forming the opposite end of the bellows for receiving said measuring signal, and means for generating a differential signal indicative of the time between transmission and receipt of said signal.

11. A system as in claim 8 and wherein said transceiver comprises a quartz wafer.

12. A system as in claim 8 and wherein said processing means comprises sampling circuits and a differentiator for producing digital difference signals; said set signal generating and transmitting means including means for digitizing said set signal; said comparison means including digital counters for producing digital error signals; and said control means including a digital-/analog converter and a power source for supplying power to said drive means.

13. A system for connecting a supporting element and a supported element for enabling relative displacement between said elements comprising a support framework secured to said supporting element and a movable framework for positioning the supported element; a closed hydraulic circuit comprising at least one pair of flexible jacks (1, 2) arranged between the support framework and the movable framework in such a manner as to position the movable framework with respect to the support framework as a function of the relative deformation of said jacks, a variable capacity reservoir (3, 4) associated with and connected to each of said flexible jacks and forming with the associated jack a closed fluid circuit so that the capacity of the associated reservoir determines the state of deformation of the respective jack; each of said jacks forming with the associated reservoir a set (1, 3 and 2, 4) and the sets of each of said pairs forming a differential system with respect to each other; a control system for said hyraulic circuit comprising drive means (19) operating on the reservoirs (3, 4) and causing oppositely directed deformation of said jacks; measuring means associated with each of said jacks for emitting a signal representative of the deformation of each of said jacks; processing means (21, 22, 23) for receiving the signals from said measuring means and for generating a differential signal indicative of the difference in the deformation of each jack in said pair; means (25) for generating and transmitting a set signal corresponding to desired deformation of said pair of jacks, and comparison means (24) for comparing said differential signal and said set signal and for transmitting an error signal representative of the difference between said differential signal and said set signal; and control means (20) operatively connected to said drive means for receiving said error signal and causing operation of said drive means in a direction tending to cancel said error signal.

* * * * *